Patented Aug. 25, 1953

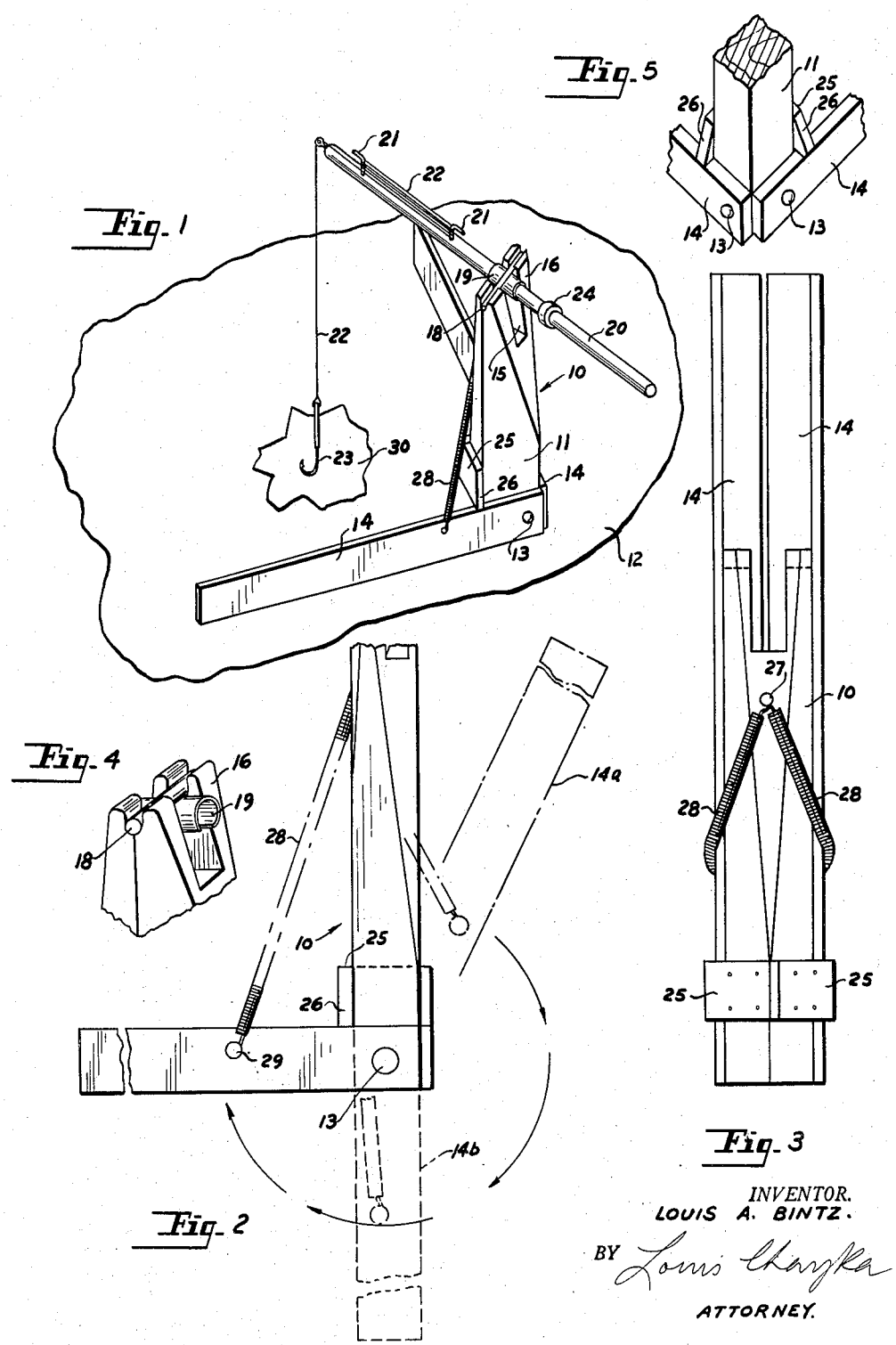

2,650,052

UNITED STATES PATENT OFFICE 2,650,052

FISHING STAND

Louis A. Bintz, Detroit, Mich.

Application February 20, 1951, Serial No. 211,947

1 Claim. (Cl. 248—46)

1

My invention pertains to a stand including an abbreviated fishing rod and line, the stand being especially adapted for ice fishing. An object of my invention is to provide a stand in which the fishing rod may be properly balanced so that even a slight tug on the fishing line depending therefrom will be immediately indicated by the tipping of the rod.

Another object of my improvement is to provide a stand which may be folded so that it will occupy a minimum of space and which may be easily carried, even in a coat pocket. A further object of my improvement is to provide a stand which is practical, simple in structure, and economical in cost.

I shall now describe my stand and the manner of its use with reference to the accompanying drawing in which:

Fig. 1 is a perspective view of my stand, including a fishing rod and a fishing line, as said stand is set up for fishing on ice;

Fig. 2 is a side elevational view of the stand in its set-up position, the view disclosing in dotted lines successive stages in having one of its members folded upon a central standard;

Fig. 3 shows the stand in its folded condition;

Fig. 4 shows a structural detail of the standard;

Fig. 5 is a fragmentary view of certain elements of my stand, disclosing their relative positions with respect to each other.

Similar numerals refer to similar parts throughout the several views.

The stand includes a standard, generally indicated by numeral 10, the standard at its lower portion 11 being rectangular in cross-section, as shown in Fig. 5. Pivotally affixed to two adjoining sides of said lower portion of the standard, by means of pins 13, are two rails 14. The upper portion of the stand is tapered from opposite directions to a diagonal across the angle of junction of the two adjoining sides of the standard, to which sides rails 14 are joined by means of said pins 13. A deep slot 15 within the top of the standard and disposed in the direction of the opposite diagonal results in the formation of a two-armed fork, each of the arms 16 having at the top a recessed bearing 17. Supported within said bearings is a shaft 18, and affixed thereto on its underside and within slot 15 is a split sleeve 19. Frictionally fitting into the sleeve is a short fishing rod 20 which at its front portion is provided with two hooks 21. The hooks are spaced from each other and serve to support a plurality of strands of a fish line 22. The outer end of the line is provided with a conventional hook 23. A slideable ring 24 is mounted on rod 20 and may be shifted longitudinally thereon in order to balance the rod for use.

As already mentioned, the standard 10 is provided at its base with two rails pivotally affixed thereto by means of pins 13, the rails forming a base of the stand in order that it may be set up on ice 12. Normally, when the stand is in its folded condition, each rail lies parallel to the side of the standard to which it is affixed, the rail being in abutment therewith. When the stand is to be set up for use each rail is swung from its pivotal connection outwardly, as shown by arrows in Fig. 2, the rail describing in its swing an arc of 270 degrees, when its progress will be checked by a stop 25. The latter is made in the form of a short block or plate affixed to the standard crosswise so that one end 26 of said block will be in the path of the rail when it is swung outwardly as described above. Successive stages of the outward swing of the rail are marked 14a and 14b, respectively. The two rails when swung out are disposed at right angle to each other in a horizontal plane, while the standard itself rises vertically from said plane.

Connected at one end to the standard by means of a bolt 27 are two coiled springs 28, the other end of one being connected to one rail 14 at 29 while the other coiled spring is similarly affixed at its other end to the other rail. When the rails are swung outwardly to positions shown in Fig. 1 the spring will keep the rails in their place with respect to said standard, preventing said standard from tipping over rearwardly. When the rails are in their unfolded position, as shown in Fig. 1, the stand may be placed on ice of a lake or river so that a fish line 22 with the hook thereon may be dropped into the water through a hole 30. The rod when supported within the forked portion of the standard is to be held within the split sleeve 19 in a substantially horizontal position. To effect this purpose rod 20 may be shifted longitudinally within said sleeve 19 so that the weight of the rod at one end, including the fish line, a hook, and a sinker, may be balanced by the weight of the rod at the other end. If this is done, even a very slight pull on the fish line will cause the front end of the rod to tip downwardly. Ring 24 when moved close to the sleeve will serve as a means of stopping excessive tipping of the rod 20. This is so because the diameter of the ring is larger than the width of slot 15.

It will be understood that some changes may be made in the construction of my stand without departing from the inventive principle disclosed herein.

What I, therefore, wish to claim is as follows:

A fishing stand including a four sided standard, a rail pivotally affixed at one end to one side of the standard at its base, another rail pivotally affixed at one end to the adjoining side of the standard at its base, the arrangement leaving two free sides of the standard, the two rails being adapted to be set up horizontally, at right angle to each other and at right angle to said standard, a coil spring attached at one end to the upper portion of the standard and attached at the other end to one rail at a point between its outer end and its pivotal connection to the standard, a similar coil spring similarly connected to the other rail, a block affixed to one free side of the standard, and another block affixed to the other free side of the standard, the blocks being disposed at a level just above that of the rails in their horizontal position, and extending over the top of said rails to prevent them from being pulled upwardly by the tension of the coil springs, the rails being adapted to be swung in an arc from their respective blocks and to be folded against said stand.

LOUIS A. BINTZ.

References Cited in the file of this patent

UNITED STATES PATENTS

| Number | Name | Date |
|---|---|---|
| 691,270 | Jones | Jan. 14, 1902 |
| 999,989 | Hancher | Aug. 8, 1911 |
| 2,023,340 | Perkulich | Dec. 3, 1935 |
| 2,159,760 | Fitzgerald | May 23, 1939 |
| 2,449,426 | Strauss | Sept. 14, 1948 |
| 2,496,090 | Grohs | Jan. 31, 1950 |
| 2,557,728 | Drumb | June 19, 1951 |

OTHER REFERENCES

Popular Mechanics—page 279, February 1939 (copy in Div. 2).